(No Model.)
J. MOHN.
BUNG BUSHING AND TAP.
No. 530,703. Patented Dec. 11, 1894.
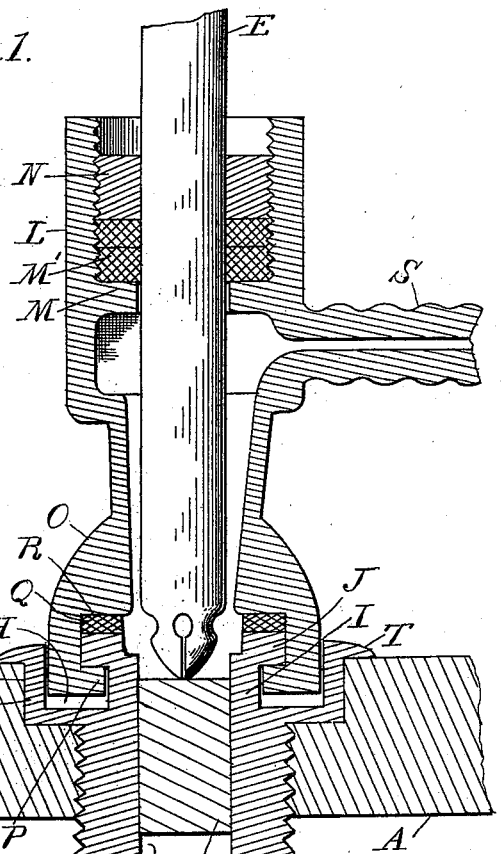
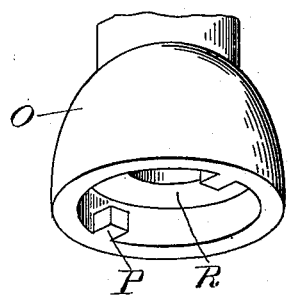
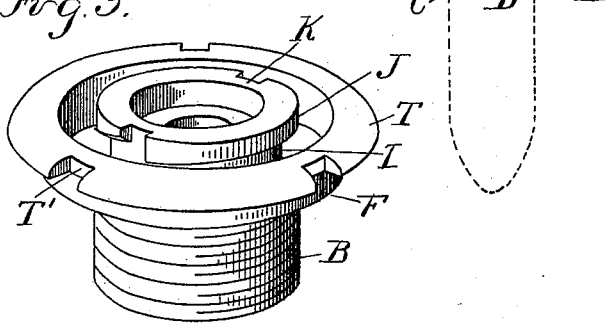
Witnesses
A. L. Hobby
L. J. Whittemore
Inventor
John Mohn
By Thos. S. Sprague & Son
Attys.

UNITED STATES PATENT OFFICE.

JOHN MOHN, OF DETROIT, MICHIGAN.

BUNG BUSHING AND TAP.

SPECIFICATION forming part of Letters Patent No. 530,703, dated December 11, 1894.

Application filed August 28, 1894. Serial No. 521,477. (No model.)

*To all whom it may concern:*

Be it known that I, JOHN MOHN, a citizen of the United States, residing at Detroit, in the county of Wayne and State of Michigan, have invented certain new and useful Improvements in Bung Bushings and Taps, of which the following is a specification, reference being had therein to the accompanying drawings.

The invention consists in the construction of a combined tap bushing and coupling and a stuffing box having a complementary coupling on its foot adapted to be engaged and disengaged with the coupling on the tap-bushing all arranged and combined as and for the purposes hereinafter set forth.

In the drawings, Figure 1 is a vertical central longitudinal section through my improved device, as in use. Fig. 2 is a perspective view of the tap bushing, and Fig. 3 is a perspective view of the foot of the stuffing-box showing the coupling.

My device is intended to be used especially in tapping beer barrels, and barrels containing similar fluids fed under pressure, and it is intended to form a permanent metallic bushing for the tap, to which the stuffing box is coupled, through both of which the tap tube is adapted to be inserted. Thus the head of the barrel is never injured, as by driving the tap into the wood, as it is usually done, and a tight joint is always insured with a simple and economical construction.

A is the head of a barrel or keg.

B is a bushing screwed into the tap hole therein, and having a central cylindrical aperture C, adapted to be closed by a cork D which may be forced into the barrel by the tap tube E. The bushing below its top has the annular cup shaped flange F, entering a counterbore G in the barrel head, and within which is the coupling socket or groove H. On the outer face of the extension I of the bushing and within the groove H, are the oppositely inclined segmental coupling flanges J, at the ends of which are the entering slots K.

L is a tubular stuffing box having the internal flange M on which rest the packing rings M' clamped by the annular packing nut N engaging a screw threaded bearing in the top of the stuffing box. At the bottom of the stuffing box is the bell shaped coupling foot O, having on its inner face the coupling lugs P adapted to engage in the slots K, and by a partial turn to couple the stuffing box to the bushing, and form a tight joint by clamping the packing ring Q between the top of the bushing and the shoulder R on the coupling foot. The edge of the coupling foot enters the groove H, so that the coupling head on the bushing is below the outer face on the barrel head. Thus when the barrel is filled, it does not project, and hence does not interfere with pasting the Government stamp over the tap hole, nor present any protuberance which may be broken.

To use the device the operator couples the stuffing box to the tap bushing and enters the tube E in the aperture through the stuffing box, forcing the cork D into the barrel. S is a nipple for securing a pipe or hose for admitting air under pressure into the barrel to force the fluid out through the tap tube.

The bushing has a face flange T adapted to rest on the outer face of the barrel head, and having suitable notches T' for a wrench hold to screw it in and out.

What I claim as my invention is—

In a bung bushing and tap, the combination with a bushing member having a threaded centrally perforated shank, a recessed outer face, and a central projection I, in the recess having oppositely inclined coupling flanges J, on its sides spaced apart, a centrally apertured stuffing box having a bell-shaped coupling foot O, formed with inwardly extending lugs P, adapted to engage the flanges J, the packing R, between the bushing and box, the flange M, in the upper end of the box, the packing M', on the same, the nut N, in the upper end of the box, and the nipple S, substantially as described.

In testimony whereof I affix my signature in presence of two witnesses.

JOHN MOHN.

Witnesses:
JAS. WHITTEMORE,
L. J. WHITTEMORE.